C. R. YOUNG.
ELECTRICAL SYSTEM.
APPLICATION FILED MAR. 1, 1918.

1,396,309.

Patented Nov. 8, 1921.
3 SHEETS—SHEET 2.

Witness:
Geo. C. Riviera

Inventor:
Clarence R. Young.
By Arthur L. Sprinkle
Atty.

UNITED STATES PATENT OFFICE.

CLARENCE R. YOUNG, OF LEESBURG, INDIANA.

ELECTRICAL SYSTEM.

1,396,309.     Specification of Letters Patent.     Patented Nov. 8, 1921.

Application filed March 1, 1918. Serial No. 219,781.

*To all whom it may concern:*

Be it known that I, CLARENCE R. YOUNG, a citizen of the United States, residing at Leesburg, in the county of Kosciusko and State of Indiana, have invented certain new and useful Improvements in Electrical Systems, of which the following is a specification.

My invention relates to electrical systems usually although not necessarily of a comparatively small capacity such as plants adapted for isolated installations as in farm homes under conditions in which the plant is generally operated by a gas or gasolene engine and the invention relates particularly to the controlling devices for such a system.

Since my invention is particularly adapted for small plants that are to be installed in various locations wherever power is to be found it is an object of the invention to devise means by which my improved controlling device may be almost wholly supported by the dynamo electric machine employed in the system for generating current, so that both generator and controller constitute structurally substantially a single unit, thus dispensing with the expense and inconvenience of providing means independent of the generator for supporting the controller mechanism.

A further object of the invention resides in the particular arrangement of controlling mechanism which I have devised for utilizing current from a storage battery for automatically maintaining the load line voltage of the system constant or approximately so.

It is a further object of the invention to provide in the improved system of the described character improved means for controlling manually the ignition of an explosive engine used as the power generator in my improved system, and a further improved means operating automatically to control the engine ignition when the battery has been given a maximum or predetermined charge during the time the generator is supplying current to the battery or load line.

It is a further object of the invention to provide in an improved electrical system of the described character an arrangement comprising a field rheostat and starting resistance making possible the use of any standard shunt generator in connection with my improved system.

It is a further object of the invention to provide in a system of the described character improved magnetically operated circuit breakers or switching mechanism for automatically protecting the battery from overcharge and also for controlling voltage on load line reducing to a more constant value during charging.

Other objects of the invention will appear from the following description of the preferred embodiment which is also shown in the drawings forming a part of the specification and in which Fig. 4 is a longitudinal sectional view through the casing of the controller taken approximately on line 4—4, Fig. 2, with parts of the interior mechanism in section and parts broken away to disclose the details of construction. A transverse sectional view through the casing is shown in Fig. 5, the section in Fig. 5 being taken approximately on line 5—5, Fig. 3, looking in the direction indicated by the arrows. Figs. 6 and 7 are broken detail views illustrating the manner in which the controller mechanism is attached to the dynamo electric machine. Figs. 8 and 9 show modified forms of attachment of the controller to the dynamo electric machine. Fig. 10 is a detail of the device for regulating the magnetically operated circuit breaker.

Figure 2:
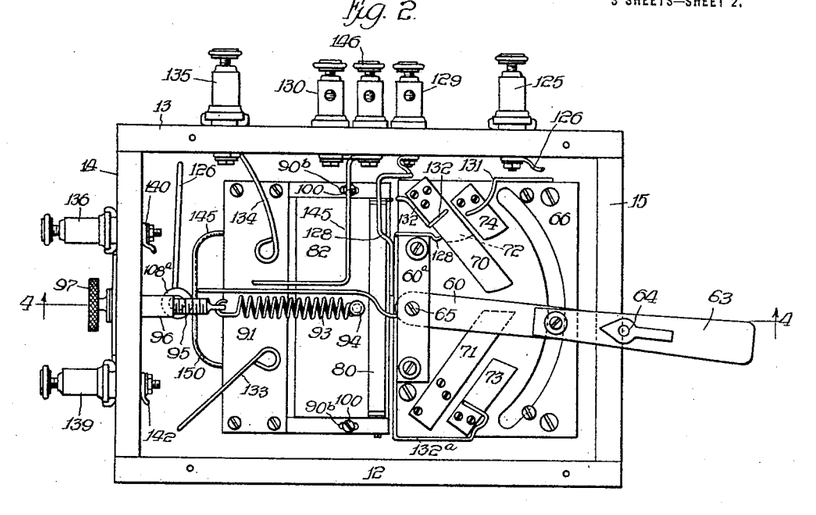
Fig. 2 is a top plan view of my controller box with the top cover removed disclosing the arrangement of the controller mechanism on the interior thereof.
Figure 3:
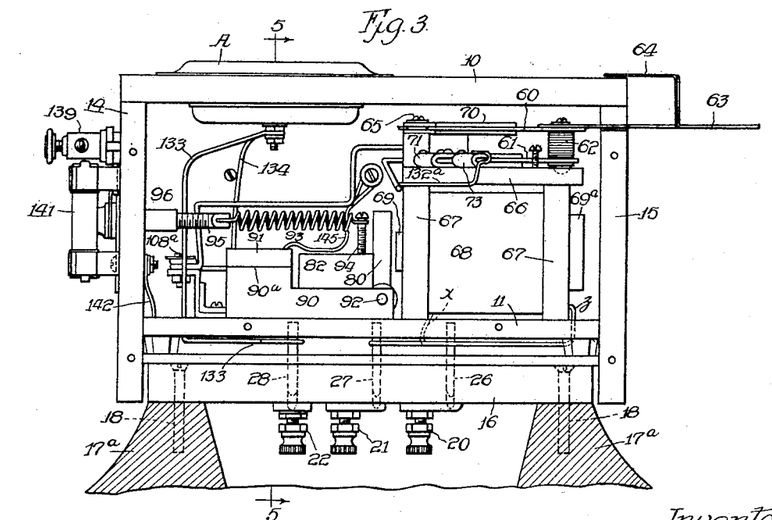
Fig. 3 is a side elevation of the controlling mechanism of Fig. 2 with one of the side plates of the controller box removed. This view also illustrates the preferred mode of attachment of the controller mechanism to the controller plate shown mounted on the specially formed top of the dynamo frame, which latter is shown in section.
Figures 4, 5, 6, 7, 8, 9, 10:
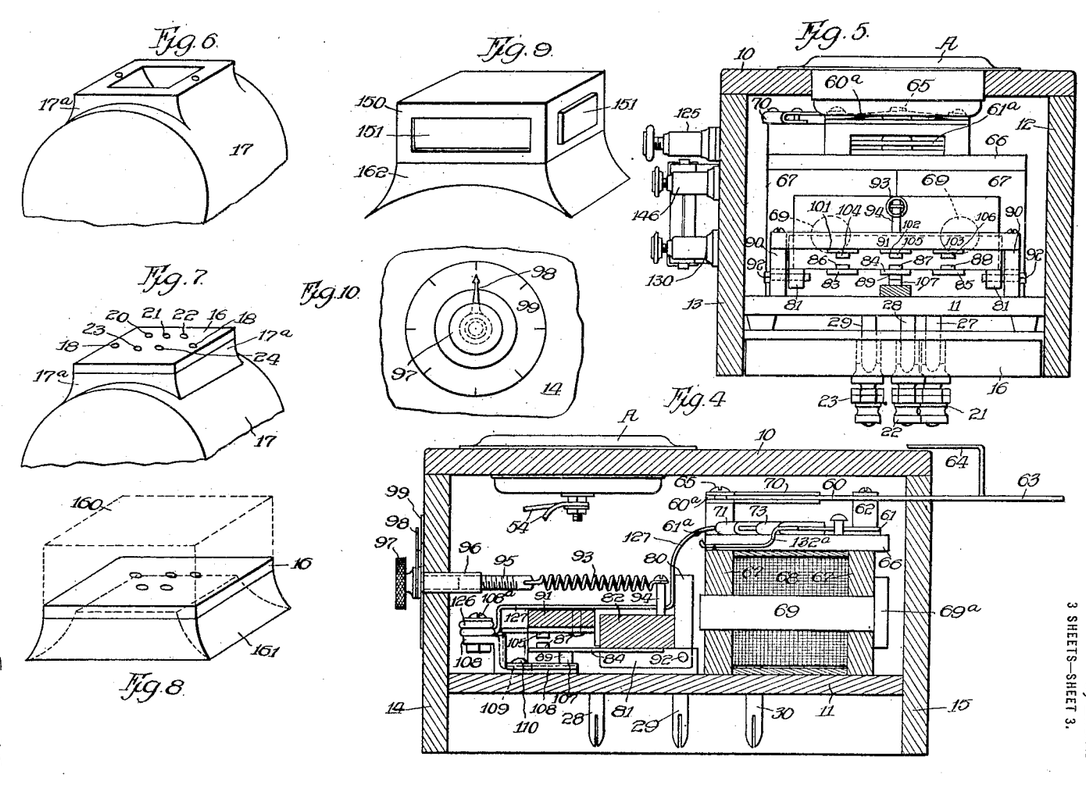
Figure 11:
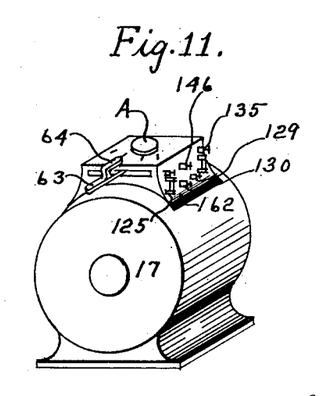
Fig. 11 is a perspective view of a dynamo casing showing the preferred manner of constructing the casing of my improved controller and mounting the same on the top of the dynamo casing.

Referring particularly to Figs. 2 to 5 inclusive the controller mechanism is shown mounted in a casing which may be of any suitable form or construction but is preferably in the form of a rectangular box having the top plate 10, the bottom plate 11, the side plates 12 and 13, and the end plates 14 and 15. The end plates 14 and 15 and the side plates 12 and 13 are preferably allowed to extend below the bottom plate 11 as indicated in Figs. 3, 4 and 5 in order that when the controller box is in position upon the top of the frame of the dynamo electric machine the downwardly projecting or petticoated portions of the sides or ends of the box may telescope over the plate 16 which is preferably formed of suitable insulating material and detachably connected to the specially formed top portion of the main frame of the dynamo electric machine as indicated by the reference character 17$^a$, Figs. 6 and 7, the main frame proper of the dynamo electric machine being designated generally by the reference character 17. The insulating plate 16 may be secured to the frame 17$^a$ by suitable means as the screws indicated by the reference character 18, Figs. 3 and 7.

It is an important feature of my invention that the controller mechanism is mounted upon the frame 17 of the dynamo and in such a manner as to be readily detachable. The electrical system comprising my invention necessitates the use of a plurality of line or circuit connections between the controller mechanism and its support, and in the embodiment of the invention shown in the drawings and herein described a plurality of circuit connections or slip connections are provided between the controller box or frame and the insulating plate 16 mounted upon the dynamo frame. On the insulating plate 16 there are shown in Figs. 3, 5 and 7, five binding posts 20 to 24 inclusive projecting downwardly from the under side of the plate each having a body portion extending through to the upper side of the plate 16, the upper ends of these posts being provided with sockets adapted to receive coöperating projections or terminals mounted upon the bottom plate of the controller box, this plate being designated by the reference character 11 and the terminals, the five projections referred to, being designated by the reference characters 26 to 30 respectively, each of these terminal posts corresponding with one of the sockets of binding posts 20 to 24 inclusive in the insulating plate 16 on the top of the dynamo frame. The terminal posts and sockets coöperate in the order named, that is, the socket of the binding post 20 receiving the terminal 26, the socket of post 21 receiving the terminal post 27, etc. The controller box thus adapted to detachably and electrically connect with its supporting plate 16 on the top of the dynamo, is designed to contain hand operated switching mechanism and an electrically or magnetically operated switch mechanism for controlling the different circuits of the system.

Figure 1:
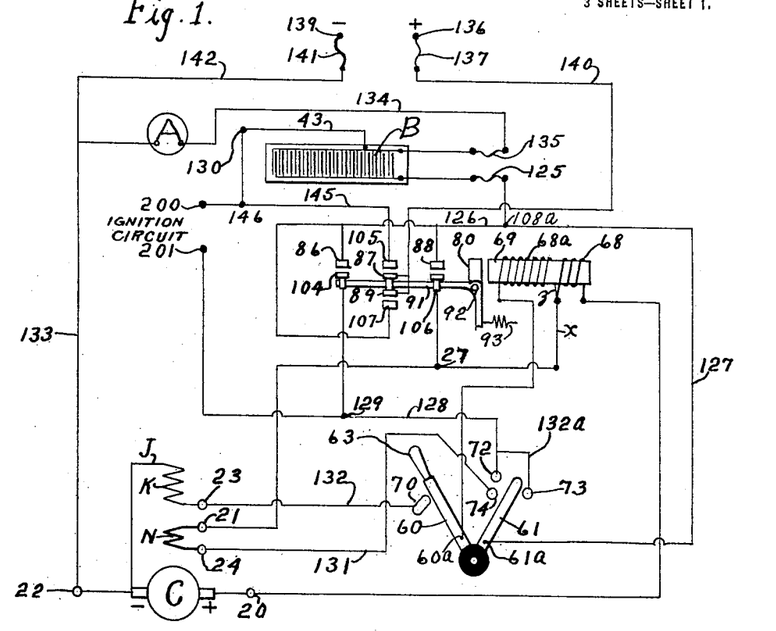
Figure 1 is a diagrammatic view of circuits and illustrating also diagrammatically the arrangement of apparatus embodying my invention.

Before proceeding further with the detail description of the controlling mechanism reference should be had to the wiring diagram setting forth the electrical arrangement of my system as shown in Fig. 1. In this diagram C is the armature of the dynamo and the positive and negative brushes are shown in contact with the armature in circuit with their respective binding posts 22, 20 corresponding to the respective binding posts 22, 24 on the insulating plate 16, the contact being made through the terminal posts 28 and 30, as before referred to. B is a storage battery. An ammeter inserted in the circuit between the storage battery and the dynamo is designated by A. 68 and 68$^a$ are duplicate magnet coils surrounding the duplicate magnetic cores 69, the winding 68 being connected in series with the external circuit of the dynamo and 68$^a$ being connected in series with the shunt field winding of the dynamo.

It will be understood that the coils 68 and 68$^a$ shown in a conventional manner in the diagrammatic view of Fig. 1 will coöperate with the cores 69 of the magnets illustrated in the structural views of the device shown in Figs. 3 to 5 inclusive, the windings of these coils being arranged in a manner well understood in the art to energize the cores of the magnets to operate the switch mechanism or as herein termed the circuit breaker.

In the arrangement of the electrical system shown diagrammatically in Fig. 1 the dynamo is indicated as of a special compound wound type in which in addition to the shunt circuit designated by the reference character J in which is interposed the winding 68$^a$ in series with the shunt field winding K, the switch terminal 70, and the shunt field switch 60, there is provided in the dynamo an additional circuit with a series field winding, this circuit being designated generally by the reference character 131 and the winding itself by N, the terminals for connection with this dynamo circuit being indicated at 21, 24. This series field circuit is shown under the control of a two-pole switch 61, constructed to make contact with terminal, 74, thus closing the series field circuit. The switch 61 is also adapted at the same time to close contact with the terminal 72 thus closing the engine ignition circuit which is a special circuit utilizing current from a limited number of cells from the battery B for the purpose of furnishing current to the ignition supply terminals 200, 201, for the gas or gasolene engine, which is preferably used for driving the dynamo, the armature of the dynamo being indicated at C Fig. 1. Either high or low tension system of ignition may be used. A second terminal 73 is provided in ignition circuit so that this circuit may be closed by switch 61 independently of contact 74 and series field circuit. It will be noted that only a small number of cells of the battery will be utilized in the ignition circuit, as for example the four cells as shown in the circuit in Fig. 1.

88, 106, 86, 104, 89, 87, 107 and 105 in the diagrammatic view in Fig. 1 correspond with contact points on the circuit breaker which is an electrically controlled switch of special construction forming a part of the controller mechanism to be presently described, 88, 86, 89 and 87 being contact points on the armature of the circuit breaker. Reference characters 142 and 140 respectively designate the negative and positive load lines connected through the binding posts 22, 20 with the negative and positive contact brushes in normal contact with the armature C, the positive load line 140 having switching connections to be presently described through the magnetic circuit breaker switches with both battery and the positive brush of the dynamo. The battery B is in circuit with the armature of the dynamo, the line 134 connecting the negative pole of the battery with the negative load line 142 and the ammeter A, which is of the small automobile type center zero capable of registering to the full capacity of the plant, is in series with the negative battery terminal in the line 134. Obviously, the ammeter A upon failure of current from the dynamo will register current from the battery to the load line circuit being in series with the battery when the current through the load line is furnished by the battery. Also the ammeter A being in series with the battery circuit when the battery is being charged from the dynamo armature C, it will also give a reading of current into the battery. The ammeter is located mechanically flush with the top of the plate 10 (Figs. 3, 4 and 5). The construction of the electrically operated circuit breaker mechanism and the hand operated two pole switch for controlling the four possible conditions of the plant will now be described. The four conditions of the plant referred to may be designated as first, the condition of the controlling mechanism in starting the gasolene engine which is accomplished by utilizing the dynamo as a motor operating it by current taken from the storage battery B to crank the motor; second, the position of the controller mechanism when the engine is normally running and the dynamo charging the battery; third, the position of the controller mechanism when the engine is in operation but the dynamo is not charging the battery or load line; fourth, condition of the controller mechanism when the engine of the plant is at rest.

*The two pole hand operated switch.*

This hand operated switch is devised to make the connections shown in the diagrammatic view Fig. 1 and is controlled by the switches 60 and 61, the switch member 61 being adapted to close upon contact 73 or on 72 and 74 simultaneously. This switch member is composed of two strips of material of good qualities of conductivity such as copper spaced apart one above the other as indicated by the parts 60, 61 (Figs. 1 to 4 inclusive). The switch members 60, 61 are preferably secured together by the suitably spaced insulating member 62 at their free ends to which is also secured the common operating handle or lever 63, projecting through a slot in the end wall 15 of the controller casing. This hand operating lever 63 carries an off-set finger or indicator 64 preferably adapted to register with the upper and outer surface of the top plate 10, which may be suitably graduated or marked as a dial. The composite switch member comprising the strips 60, 61 held in spaced relation is pivoted at its fulcrum end at 65 to separately insulated hinged terminals 60$^a$, 61$^a$, which are mounted on a fiber base comprising the rectangular plate designated by the reference character 66, which is mounted directly on top of the magnet assembly as shown for example in Figs. 3 and 4. The magnet assembly consists of the fiber guard plates which are of rectangular form and designated by the reference character 67, there being one of such plates at each end of the two magnet coils 68 and 68$^a$ on magnet cores 69. On the plate 66 of insulating material are mounted the switch segments. These switch segments are preferably formed of the same material as the members 60, 61 on the switch lever and they each consist of socket parts of two part knife switches the members 60, 61 constituting the blade portions of each of the switches. The pivotal connection of the switch lever with the plate 66, and the slot in the end wall 15 of the casing are such as to permit the turning of the switch lever and handle 63 through an angle extending from approximately one corner of the inclosed casing to the opposite corner, for the purpose of putting the controlling mechanism in each of the different positions or conditions to which the system is susceptible of being adjusted or operated as already stated, these positions being first, the starting position; second, the charging position; third, the position in which the engine runs without causing the dynamo to supply current to the load line or battery; fourth, the position in which the circuit from the battery to the engine is broken so that the engine remains idle. These four positions I prefer to mark on a suitable dial on the top of the controller casing beneath the indicator finger 64, the position of "Starting" being at the extreme right and the position "Engine" indicating the position in which the engine runs without charging the battery or load line, being at the extreme left. I then provide two intermediate positions on the segment dial on the top of the plate 10, these positions being located so that the distance between each of the four positions, that is the distances from one position to the next position of the lever 63 and the indicator finger 64 attached thereto are equal, the position next to the one at the right marked "Starting" on the dial being marked "Charge" and the other position between the "Charge" position and the "Engine" position being designated by the mark "Off." The switch segment or socket 70 is elongated so that the shunt field circuit is closed when the indicator 64 points to "Start" and "Charge" but is broken for the other two positions. The long segment or socket designated by the reference character 71 on the other side of the handle is a dummy or guide socket employed only for holding in place the switch when turned to the "Off" position. A short segment or socket 72 on the side of the switch just beneath the long segment 70 corresponds to the terminal 72 of Fig. 1, and the small segment 73 on the other side of the switch member corresponds to 73 of Fig. 1, the segments or sockets 72, 73 being electrically connected so that the terminals corresponding to 61ª and 72 or 73 (Fig. 1) may be connected when the lever is in either the "Start" or "Engine" positions.

This short segment or socket 72 is shown in the drawings only by dotted lines, Fig. 2, below elongated socket 70. In construction it is identical with the segment 73. There is also a third small segment 74 similar to the segments 72, 73 on the same side of the switch lever as the segment 72. This is located in the plane of the segment 72 and by the side of it so that the segments 72 and 74 may be synchronously engaged by the lower switch blade 61. The provision of the two short segments 72, 74 side by side for synchronous engagement by the switch lever and the further provisions of the short segment 73 at the opposite limit of movement of the switch lever will be apparent from the diagrammatic illustration, Fig. 1, and since it is desirable to have the switch member 61 engaging both contacts 41 and 42 synchronously, this may be accomplished by the construction of the segments 72 and 74 permitting synchronous engagement by the switch member 61 while the movement of the lever to the opposite extremity will connect only with the segment 73.

*The circuit breaker construction.*

This consists of the magnets and the armature with the switching apparatus carried thereby. The electromagnets are constructed of two independent windings 68, (Figs. 3 and 4) on the soft iron cores 69. These cores are in two parts connected by a yoke of soft iron 69ª on the outside of one of the spaced fiber guards 67, the cores being also anchored in the fiber guards 67 with the windings between those guards and the soft iron cores projecting through the guards at their free ends a short distance as indicated in Figs. 3 and 4 to simultaneously coöperate with the armature 80 of the circuit breaker switch. The fields of the magnets 68, are in duplicate and connected in series according to the common practice in magnet construction. The desired results in these magnet windings may be accomplished by the use of about six layers of about twenty-eight turns each of number 18 double cotton covered magnet wire, and two layers of twelve turns each of number ten double cotton covered magnet wire. This manner of winding will give about the desired ratio for dynamoes of 0.5 to 0.75 K. W. 40-volt, which are about right for the average farm or other small plant, using small explosive engines for operating the dynamo. The number 18 winding referred to will obviously correspond with the coil 68ª, Fig. 1, shown and described as connected in series with the dynamo shunt field and the number 10 winding corresponding to the winding 68 of Fig. 1 in series with the external circuit of the dynamo, the object of the difference in the windings being to produce in each of the coils ampere turns of windings theoretically equal for the purpose of causing the magnets to theoretically lose their magnetic qualities upon the reversal of the current through the magnet coils upon failure of the charging current as well understood in the art.

The circuit breaker armature proper designated by the reference character 80 is of soft iron and consists of a rectangular plate secured to a fiber block 82 of about the length of the plate, the said block being rectangular in form and having secured to the lower side of it at its ends two pieces of metal 81 as aluminum preferably projecting beneath the lower edge of the armature plate. Also on the under side of the fiber block 82 are mounted three thin metallic switch segments of good electrical conductivity, 83 to 85 inclusive, and carrying on their ends opposite to the supporting fiber block 82 contact points 86 to 89 inclusive. The segments 83 and 85 near the ends of the fiber block 82 carry the contact points 86, 88 respectively only on their upper surface while the segment 84 near the middle of the armature block carries the contact point 87 on its upper surface and also the contact point 89 on its lower surface. Two supports or standards 90 are provided for supporting the armature assembly. These comprise elongated plates each having a portion at 90ª about twice the height of the normal body of the support and to these elevated portions 90ª of the supports 90 the fiber strip 91 is secured bridging the space between the supports. The supports or standards 90 are provided with pivot pins 92, the pin of each support being journaled in the end members 81 of the armature assembly. It is on these pivot pins 92 that the armature assembly rotates through a limited amount of movement under the influence of the magnets against the resistance of the tension spring 93 secured at one end to pin 94 and at its other end to the member 95, which is made longitudinally adjustable in relation to the wall 14 of the casing by being screw threaded into the sleeve 96 rotatably mounted in the casing wall 14 and having attached thereto an operating member 97 knurled as indicated for ease in turning it. An elevation of the operating member 97 is shown in Fig. 10 and it will be seen that it has attached thereto or to the sleeve 96 thereof an indicator finger 98 coöperating with a registering face or dial 99, the latter attached to the outside wall 14 of the casing. The dial 99 may be suitably graduated to indicate different degrees of adjustment of the tension of the spring 93, which controls the armature of the circuit breaker switching mechanism. The size of the gap between the ends of the cores 69 and the circuit breaker armature plate 80 should be capable of adjustment to adapt the controller for use with any capacity dynamo, since as the magnets become too strong or too weak in their actions it is desirable to vary the distance between the armature 80 and the magnets in order to obtain the desired strength of magnetic pull to satisfactorily operate the circuit breaker switch mechanism. The side supports or standards 90 are slotted at 90ᵇ, (Fig. 2), and are adjustably secured to the fiber base 11 by the screws 100, which will permit movement of the armature assembly as a whole on the supports 90, a distance equal to the length of the slots less the diameter of the fastening screws 100. To the under side of fiber plate 91 is secured three segments 101 to 103 respectively, each of which is provided with a contact point designated by the reference characters 104 to 106 respectively and adapted to be engaged by the contact points 86 to 88 respectively on the upper sides of the segments 83 to 85 on the movable armature assembly. Coöperating with the contact 89 on the under side of the middle segment 84 is contact 107 mounted upon the support 108 which is slotted as indicated at 109, to take the securing screw 110 by which it may be adjustably secured to the fiber base 11, so that it may be given a degree of adjustability corresponding to the adjustments of the armature assembly on the fiber base 11 in order to insure that the contact points 89 and 107 may coöperate at all times.

The adjustment of spring 93 for regulating the tension of the armature assembly as shown by the indicator finger 98 and the dial 99 may be utilized to adapt the controller for use with dynamos and storage batteries of different capacities. The indicator dial 99 may be graduated to indicate volts, and the voltage at which the circuit breaker spring 93 will operate to disengage the circuit breaker armature and switching mechanism carried thereby from the magnets may be controlled by setting the indicator 98 to indicate the desired voltage on indicator dial 99. In this way the adjustment of the switch determines at what voltage the switch will open and close.

The above description of the details of construction of my hand operated switch and of the magnetic circuit breaker taken together with the description of the slip switch connection of the controller with the dynamo frame comprises the chief mechanical features of the system and controller. While an explosive engine is referred to as used in connection with the system, this like most of the details of the dynamo of common commercial form is uneffected by the invention comprised in my system except in so far as the usual battery ignition circuit of such an explosive engine is controlled as herein described. There are however certain details relating to the wiring connections between the various parts of the system and details with respect to the various terminals and fuses that will be explained in connection with the following which details the mode of operation of my improved system.

With the apparatus properly installed and connected with the prime mover or gasolene engine, it will be apparent from the preceding description that the entire operation of the system or plant is accomplished by the manipulation of the one switch lever 63 so that the pointer 64 thereon will register with either of the four positions referred to on the top plate 10 as marked "Start", "Charge", "Off" and "Engine". To start the engine the hand lever 63 is turned to "Start" position which is the position to the extreme right as the operator faces the top plate dial. This will result in contact between top switch blade 60 and segment 70 closing the dynamo shunt circuit because segment 70 is wired to contact 29 in the bottom plate 11 of the controller and this engages the corresponding binding post or socket 23 in the insulating plate 16 on the specially formed top of the dynamo. The switch member 60 is in circuit with magnet coil 68ª which latter is wired as a part of the shunt field circuit to connect with the dynamo. The same movement of the hand lever 63 to the "Start" position also closes the contacts 72 and 74, because the switch member 61 carried by the hand lever will synchronously engage both the segments 72, 74, contact 72 being in the engine ignition circuit. This will result in ignition being furnished to the ignition supply terminals 200 and 201 from the four end cells of the battery, the circuit being traced (Figs. 1 to 5 inclusive) from the positive side of the battery through binding post 125, thence through line 126 (Fig. 2), downwardly through insulating plate 11 thence to the opposite corner of the box on the same side, thence the line 126 comes upwardly through the plate 11 and connects with the binding post 108$^a$ of the circuit breaker contact support 108, thence through line 127 to switch member 61, segment 72 immediately beneath the long segment 70, through line 128 to post 129 which is wired to engine ignition supply terminal 201, through ignition supply, thence into controller through ignition supply terminal 200, binding post 130 and out on line 43 (Fig. 1) to positive side of battery four cells from the end placing these limited cells in series with the ignition circuit. Finally it should be noted that the placing of lever 63 in starting position also closes the series field circuit of Fig. 1 because of the synchronous engagement of switch lever 61 and its terminal 61$^a$ with contacts 72 and 74, thus strengthening the field of the motor and greatly increasing its starting torque. With the lever of the controller in "Start" position this closed series field circuit is as follows:

From positive battery terminal 125 through lines 126 and 127 switch member 61, segment 74 and line 131, through base 11 to terminal 30 and binding post 24 to dynamo series field N, thence out of said field into controller through binding post 21 to terminal 27, thence in parallel (Figs. 1 and 3) through magnet coils 68$^a$ and 68, the shunt circuit through coil 68$^a$ passing thence through switch member 60, segment 70, and line 132 to terminal post 23 and shunt field winding K of the dynamo, thence through binding post 22, line 133 and ammeter, through line 134 to battery, while dynamo external circuit is traced through winding 68 and binding post 20 to positive brush of armature, and out through negative brush and binding post 22, terminal 28, and line 133 through ammeter, line 134 and binding post 135, also to negative pole of the battery. Prior to and during the time of starting and before dynamo will supply current, the current on the load line is maintained through circuit breaker points 89, 107 over line 140 leading from the positive pole of the battery through fuse 125 to the positive terminal 136 of the load line, a fuse being indicated at 137, and from the negative pole of the battery through line 134, ammeter A, and load line 142 through fuse 141 to the negative load line terminal 139.

As soon as the placing of the hand switch 63 of the controller mechanism in the "Start" position as described results in sufficient operation of the dynamo acting as a motor to crank the engine causing it to operate under its own power, the ignition starting circuit being closed as described, and when the engine in turn drives the dynamo so that it begins to cause the flow of current, and upon the predetermined voltage for which the circuit breaker is set the fields 68 and 68$^a$ of the magnets are sufficiently energized to cause the armature 80 of the circuit breaker to shift into engagement with the iron core 69 of the magnets, breaking the contacts 89, 107 of the circuit breaker, and causing contact of points 86, 104, 87, 105 and 85 and 106 respectively. The breaking of the contact points 89, 107 disconnects the load line from the end battery terminal but the shifting of the circuit breaker switch under the influence of the magnets when the dynamo is charging will obviously result in connecting the battery with the load circuit through contacts 87, 105 on the controller mechanism, the positive load line being connected preferably about four cells in from the positive end of the battery as indicated in Fig. 1 for the purpose of switching onto but twelve or thirteen cells of the battery instead of sixteen, thereby retaining the voltage from the battery on the load line which remains approximately constant or equal to the normal voltage of the whole sixteen cells of the battery when the dynamo is not charging. This is due to the fact that there is a difference of potential between the end cells of the battery of between 35 and 42 volts as compared with a range of 28 to 33 volts when the battery is on discharge. With this arrangement of switching mechanism if the dynamo is properly designed for use with the battery, the proper charging rate will be maintained throughout the complete charge, assuming of course, that the engine runs with a fair degree of constant speed and drives the dynamo at its approximate rated speed. In a plant of this character it is well known that the voltage increases as the charge proceeds and the current proportionately decreases. When after starting the dynamo voltage has reached the predetermined value at which the circuit breaker is set to operate, the resulting condition of the circuits through the controller mechanism would then be described as follows:

The breaking of the contacts 89, 107 and the closing of the three pairs of contacts on the upper sides of the circuit breaker will obviously not stop the operation of the plant because the ignition circuit will be maintained from the positive battery terminal through contacts 86 and 104, the circuit entering the controller mechanism through binding post 125, thence through line 126 to binding post 108ª of support 108, thence through line 145 to contact 104, thence through contact 86 on the circuit breaker and to ignition terminal post 129, to ignition supply terminal 201, thence through ignition supply terminal 200, to post 146, thence to post 130 and thence to battery over line 43. As soon as the engine has picked up sufficiently to operate the dynamo so as to reverse the flow of the current and to energize the magnets to operate the circuit breaker mechanism, the controlling switch lever 63 may be thrown to the "Charge" position which breaks contacts 61ª, 74 and 72, but retains the switch 60 in closed position closing the dynamo shunt circuit but cutting out the series field coil N of Fig. 1, which is no longer needed since its only function is to increase the torque in starting, after which the dynamo will perform as a standard shunt dynamo as long as the charge proceeds and the circuit breaker mechanism is held in its shifted position against action of the controlling spring 93 because of the pull of the magnets. In this normal position the circuits from dynamo to battery and from battery to load line are as follows:

From the positive side of the dynamo the circuit enters the controller through binding post 20 and terminal post 26, thence through magnet windings to contacts 88, 106, the contact 106 being carried by the stationary segment 103 of the circuit breaker and wired to connect through line 150 through post 108ª and line 126 to positive battery terminal post 125, and from negative battery post 135 through ammeter and line 133 to terminal 28 and its coöperating binding post 22 leading to the negative side of the dynamo. This position of "Charge" in the controller results in the load line from the negative pole 135 of the battery being maintained through ammeter, line 142 and fuse 141 to negative load line post 139. In charging position the positive load line circuit is maintained out of the battery from about the fourth cell from the positive end as indicated in Fig. 1 through a line corresponding to 43 of Fig. 1, thence through ignition binding posts 130 and 146, line 145 contacts 105 and 87 and line 140 to positive load line binding post 136 through interposed fuse 137.

An important feature of my improved controller mechanism is that if anything abnormal occurs to cause the dynamo current during the charging operation to diminish below the predetermined value as established by the circuit breaker adjustment the magnets failing to hold the armature against the tension of the circuit breaker spring and permit it to be shifted will cause the plant to automatically shut down, this feature insuring against any accidental injury to the plant. I regard this as a very important feature of the invention since it makes the plant dependable under all circumstances because it may be left without an operator in attendance when charging. For example, if during the charging operation the engine runs out of fuel, if a wire breaks, if the belt or other means operating the dynamo from the engine breaks, or if any other condition arises which necessitates shutting down of the plant this will be accomplished automatically in the absence of an operator and thereafter battery current will feed the load line so that service for lighting or other purposes will not be interrupted. If the plant is charging and it be desired to stop it the controlling switch is turned to the "Off" position thereby breaking the field circuit connection between switch member 60 and switch segment 70 opening shunt circuit demagnetizing the coils 68 and 68ª and permitting release of circuit breaker, opening circuit breaker contacts operating on "Charge" and reëstablishing load line connection with the battery through contacts 89, 107 thus returning the load circuit to the full 16 cells of the battery.

The position of the controlling switch lever 63 designated as "Engine" is provided to allow the running of the engine without charging, and when the switch is thrown in this position the switch lever 61 engaging contact 73 the engine ignition circuit is closed. This feature of the controller is of importance in operating the engine at any time that power is required when it is not desirable to charge the battery. Under such conditions, assuming that the engine is at rest with battery fully charged and it being desired to operate the engine without charging the battery, the controlling switch lever 63 will be thrown to the "Start" position thereby cranking the engine electrically from the battery. Then by watching ammeter reading it will be noted when the pointer passes from the "Discharge" side of ammeter through zero toward "Charge" side it will be apparent that the engine is running under its own power. The controller switch 63 may now be thrown to the extreme left of "Engine" position, thereby retaining the ignition circuit closed, but opening the shunt field circuit under which conditions the engine will continue to run for the service desired but the dynamo will not charge. If it be desired to charge while the engine is running in this way the controller lever may be thrown from the "Engine" position to the "Charge" position with the result that the "Charge" connections before described will be reëstablished under the automatic control of the circuit breaker mechanism. If it be desired to stop the engine while running with the controller lever in the "Engine" position without charging, the simple turning of the controlling lever to the "Off" position thereby breaking the ignition circuit will stop the engine with all connections open preventing reversal of current from the battery through the dynamo.

It is found that the combination of the controller mechanism into what may be termed single unit with the dynamo by the slip connection of the terminal posts 26 to 30 inclusive with the corresponding sockets in binding posts 20 to 24 inclusive results in very efficient operation because this connection reduces the mechanical and wiring connections between the controller and the dynamo to the minimum with respect to electrical resistance, and results in the elimination of troubles and disadvantages in the ordinary connecting transmission devices between the mechanically operated dynamo and controller. The compactness of the assembly of controller and dynamo also makes the unit more readily portable, thereby resulting also in economy of installation.

In order to present the embodiment of my invention in the simplest form I have in Figs. 2 to 5 inclusive shown the controller casing formed of plates of insulating material as wood or fiber. Under certain conditions and in order to simplify manufacturing of the controller casing or to improve the appearance of same the controller casing instead of being made of insulating material as wood or fiber may be made of metal. When made of material of good electrical conductivity it will obviously be necessary to insulate the electrical connections from the casing walls. This may be done by openings in the walls of the metallic casing closed by cover plates of insulating material as indicated in Fig. 9 of the drawings. In this view the outlines of the metallic controller casing are indicated by the reference character 150 and cover plates of insulating material wherever it is desired to pass electrical connections through the casing are indicated at 151. In this form of dynamo main frame illustrated in Figs. 6 and 7 the fiber plate 16 containing the binding posts and sockets comprising the dynamo terminals is shown of a size corresponding to the flattened top portion 17ª of the dynamo main frame. Obviously, in the manufacture of the controller mechanism a certain amount of uniformity in the size of the casing must be maintained resulting in restriction as to size of the fiber base plate 16 to be attached to the top flattened surface of the dynamo frame to contain the line terminals and to support by these slip connections the controller mechanism. There is considerable variation in the size of the top flattened portions 17ª of various dynamo frames and in some cases the fiber base plate 16 may be somewhat larger than the top flattened portions of the dynamo main frame, as shown for example in Fig. 8 in which a similar controller casing 160 embodying the features of my controller is shown mounted upon the top of the fiber plate 16. In this view I show the addition of a supplemental depending frame to fill out the contour between the controller casing and the dynamo frame as indicated by the reference character 161. In Fig. 9 it will be noted that the pressed steel controller casing 150 is provided with an integral depending or petticoated portion as indicated at 162 rounding out the contour between the casing and the dynamo main frame.

I claim:

1. In an electrical system the combination with an internal combustion engine, of a dynamo operatively connected with said engine, said dynamo having a shunt field winding and a series field winding, a storage battery, a load line circuit, circuit connections between the storage battery and the dynamo, circuit connections between the storage battery and the load line circuit, an engine ignition circuit connecting the battery and internal combustion engine, hand operated switching mechanism for controlling the engine ignition circuit, the shunt field circuit of the dynamo and the series field circuit, a second switching device for controlling the circuits between the load line circuit, battery, dynamo and also the engine ignition circuit, and an electromagnetic responsive device for operating the last mentioned switching device comprising a compound magnet coil, one winding of which is in series with the dynamo external circuit and the other winding of which is in series with the dynamo shunt field winding, the said load line circuit being connected to be supplied with current by the dynamo or by the battery in accordance with the position of said second switching device.

2. In an electrical system the combination with an internal combustion engine, of a dynamo operatively connected with said engine, said dynamo having a shunt field winding and a series field winding, a storage battery, a load line circuit, circuit connections between the storage battery and the dynamo, circuit connections between the storage battery and the load line circuit, hand operated switching mechanism for controlling the shunt field circuit of the dynamo and the series field circuit, a second switching device for controlling the circuits between the load line circuit, battery and dynamo, and an electromagnetic responsive device for operating the last mentioned switching device comprising a compound magnet coil, one winding of which is in series with the dynamo external circuit and the other winding of which is in series with the dynamo shunt field winding, the said load line circuit being connected to be supplied with current by the dynamo or by the battery in accordance with the position of said second switching device.

3. In an electrical system the combination with an internal combustion engine, of a dynamo operatively connected with said engine, said dynamo having a shunt field winding and a series field winding, a load line circuit, a storage battery, circuit connections between the storage battery and the dynamo, circuit connections between the storage battery and the load line circuit, an engine ignition circuit connecting the battery and internal combustion engine, hand operated switching mechanism for controlling the engine ignition circuit, the shunt field circuit of the dynamo and the series field circuit, a second switching device for controlling the circuits between the load line circuit, battery and dynamo and also the engine ignition circuit, an electromagnetic responsive device for operating said last mentioned switching device comprising a compound magnet coil, one winding of which is in series with the generator external circuit and the other winding of which is in series with the dynamo shunt field winding, a spring opposing the action of said electromagnetic responsive device upon said switching mechanism, and means for adjusting the tension of said spring.

4. In an electrical system the combination with an internal combustion engine, of a dynamo operatively connected with said engine, said dynamo having a shunt field winding and a series field winding, a load line circuit, a storage battery, circuit connections between the storage battery and the dynamo, circuit connections between the storage battery and the load line circuit, hand operated switching mechanism for controlling the shunt field circuit, a second switching device for controlling the circuits between the load line circuit, battery and dynamo, an electromagnetic responsive device for operating said last mentioned switching device comprising a compound magnet coil, one winding of which is in series with the generator external circuit and the other winding of which is in series with the dynamo shunt field winding, a spring opposing the action of said electromagnetic responsive device upon said switching mechanism, and means for adjusting the tension of said spring.

5. In an electrical system the combination with an internal combustion engine, a dynamo operatively connected with said engine, said dynamo having a shunt field winding, a load line circuit, a storage battery, circuit connections between the storage battery and the dynamo, circuit connections between the storage battery and the load line circuit, an engine ignition circuit connecting the battery and internal combustion engine, hand operated switching mechanism for controlling the engine ignition and the shunt circuits, a second switching device for controlling the circuits between load line circuit, battery and dynamo and controlling also the engine ignition circuit, and an electromagnetic responsive device for operating said last mentioned switching device comprising a compound magnet coil one winding of which is in series with the dynamo external circuit and the other winding of which is in series with the dynamo shunt field winding.

6. In an electrical system the combination with an internal combustion engine, a dynamo operatively connected with said engine, said dynamo having a shunt field winding, a load line circuit, a storage battery, circuit connections between the storage battery and the dynamo, circuit connections between the storage battery and the load line circuit, hand operated switching mechanism for controlling the shunt field circuit, a second switching device for controlling the circuits between the load line circuit, battery and dynamo, and an electromagnetic responsive device for operating said last mentioned switching device comprising a compound magnet coil one winding of which is in series with the dynamo external circuit and the other winding of which is in series with the dynamo shunt field winding.

7. In an electrical system the combination with an internal combustion engine, a dynamo operatively connected with said engine, said dynamo having a shunt field winding and a series field winding, a load line circuit, a storage battery, circuit connections between the storage battery and the dynamo, circuit connections between the storage battery and the load line circuit, an engine ignition circuit for supplying current from the battery to the internal combustion engine, hand operated switching mechanism for controlling the engine ignition circuit and also the shunt and series field circuits, a second switching device for controlling the circuits between the load line circuit, battery and dynamo and controlling also the engine ignition circuit, and an electromagnetic responsive device for operating said last mentioned switching device.

8. In an electrical system the combination with an internal combustion engine, a dynamo operatively connected with said engine, said dynamo having a shunt field winding and a series field winding, a load line circuit, a storage battery, circuit connections between the storage battery and the dynamo, circuit connections between the storage batery and the load line circuit, an engine ignition circuit for supplying current from the battery to the internal combustion engine, hand operated switching mechanism for controlling the engine ignition circuit and also the shunt and series field circuits, a second switching device for controlling the circuits between the load line circuit, battery and dynamo and controlling also the engine ignition circuit, and an electromagnetic responsive device for operating the last said switching device and comprising in part a compound coil, one winding of which is in series with the external circuit of the dynamo the other winding being in series with the shunt field circuit of the dynamo.

9. In an electrical system the combination with an internal combustion engine of a dynamo operatively connected with said engine, a load line circuit, a storage battery in circuit with the load line circuit and with the dynamo, an ignition circuit between the storage battery and internal combustion engine, a hand operated switch for controlling the ignition circuit, an independent switching device for controlling the ignition circuit, and an electromagnetic responsive device for operating the last said switching device, comprising in part a compound coil, one winding of which is in series with the external circuit of the dynamo, the other winding being in series with the shunt field circuit of the dynamo, the said winding being so arranged in the respective coils that their resultant magnetic effect will be cumulative when the dynamo is charging into the battery but will tend to neutralize the magnetic effect of each when the current reverses from the battery through the dynamo.

In testimony whereof I have signed my name to this specification on this 6th day of February, A. D. 1918.

CLARENCE R. YOUNG.